Jan. 1, 1963

K. E. HAUGHTON ETAL 3,071,773

RECORDING TRANSDUCER MOUNTING

Filed Feb. 26, 1959

INVENTORS
KENNETH E. HAUGHTON
JACK O. HILDEBRAND
BY
ATTORNEY

United States Patent Office 3,071,773
Patented Jan. 1, 1963

3,071,773
RECORDING TRANSDUCER MOUNTING
Kenneth E. Haughton and Jack O. Hildebrand, San Jose, Calif., assignors to International Business Machines Corporation, New York, N.Y., a corporation of New York
Filed Feb. 26, 1959, Ser. No. 795,752
7 Claims. (Cl. 346—74)

This invention relates to a biaxial torsion bar element particularly useful in maintaining a hydrodynamically supported recording transducer in precise constant spaced relation to a rapidly moving recording surface so as to enable the transducer to smoothly follow the contour of the recording surface.

In the prior art, hydrodynamically supported recording transducers of the type which, for example, ride on a thin film of fluid such as air passing between a transducer and an associated recording surface, have been mounted in gimbals to insure that they are free to seek an equilibrium position with respect to the recording surface thereby permitting an extremely constant spacing of the transducer from the recording surface to be maintained as it moves rapidly therebeneath. However, where gimbals are used their pivot points necessarily include some small degree of looseness or slack which tends to increase due to wear during use. In data processing machines employing magnetic recording of data on a number of parallel or concentric closely spaced recording tracks, such loosenss or lost motion can effectively limit the closeness of the track spacing due to the introduction of transducer positioning errors with respect to the proper recording track. Thus, to achieve extremely close positioning tolerances with a magnetic recording transducer, and hence closer track spacing it is desirable to mount the transducer rigidly to a positionable supporting member thereby eliminating the lost motion above. However, it remains highly desirable that the transducer should follow the recording surface even though rigidly mounted.

Therefore, it is an object of the invention to provide an improved transducer mounting, in general, and more particularly it is an object of the invention to provide a substantially rigidly mounted hydrodynamically supported transducer which is nevertheless free to seek its own equilibrium position with respect to an associated recording surface.

Where hydrodynamically supported recording transducers have been mounted in gimbals, the gimbals (being necessarily of a non-resilient material) will not "take up" or absorb sudden compressive forces or "loading" applied thereto. Therefore, resilience has had to be provided in the member which supports the gimbals rather than in the gimbals themselves. However, the present invention is itself resilient and free to "take up" shocks in its "loading."

Therefore, it is still another object of the invention to provide a resilient recording transducer mounting which also permits the transducer to follow the contour of a recording surface.

By their nature, the intersecting axes of a gimbal are always located along diameters thereof and this requirement has substantially dictated that the pole tip of a recording transducer be located approximately in the center of the gimbal ring in order to maintain a proper and constant electrical recording relationship between the recording surface and the transducer. More particularly, a gimbal mounting for a hydrodynamically supported transducer without more, will carry the hydrodynamic bearing portion of the transducer substantially parallel to the recording surface. In other words, such a transducer would not ordinarily be expected to "plane" along the recording surface. However, according to the present invention the axes of flexing or rotation are not so limited and hence the transducer bearing portion can be made to "plane" along the air film therebeneath, i.e., the forward portion can ride further away from the recording surface than the rear or trailing portion. In this manner, the pole tip or active portion of the recording transducer can be more closely spaced to the recording surface with a commensurate increase in the number of discrete data bits which can be recorded per lineal increment along any particular recording track on the surface.

Therefore, a further object of the invention is the provision of a recording transducer mounting which permits a closer spaced relation of a transducer with its coacting recording surface. According to the present invention, a thin, flat resilient X shaped torsion element, preferably stamped or etched from a single sheet of suitable material such as spring steel, has been provided between a transducer and a support arm so that each member of the X can twist the other about the longitudinal axis of the latter, i.e., in the nature of a pair of torsion bars interconnected to twist each other. Thus, considerable simplification has been effected with a corresponding reduction in manufacturing and maintenance expense.

Therefore, it is yet a further object of the invention to provide a simplified, inexpensive transducer mounting.

It is still a more particular object of the invention to provide a transducer mounting having a pair of interconnected torsion members.

In data processing machines where physical space is a critical factor and wherein coplanar magnetic recording surfaces are employed, such as in a stack of rotating magnetizable discs, the closer such discs can be spaced the less room will be necessary to house the overall structure. The biaxial torsion element of the subject invention permits considerable saving to be made in the overall thickness of a transducer assembly which is particularly useful in such applications, i.e., those utilizing a pair of transducers which operate between two such rotating discs.

Therefore, it is another object of the present invention to provide an improved transducer mounting which permits a considerable reduction in its overall thickness.

Other objects of the invention will be pointed out in the following description and claims and illustrated in the accompanying drawings which disclose, by way of example, the principle of the invention and the best mode which has been contemplated of applying that principle.

Figure 1:
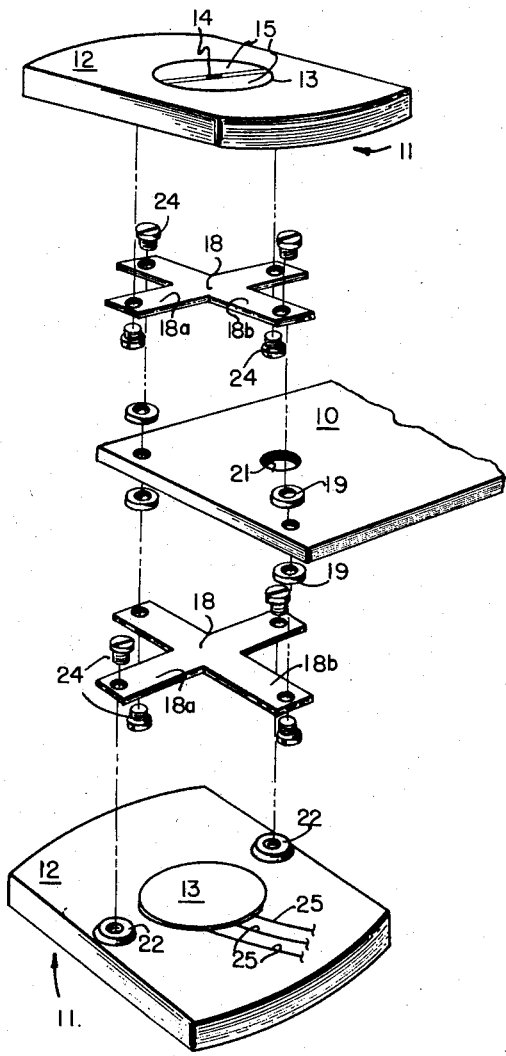
FIG. 1 is an exploded perspective view of a dual transducer assembly for insertion between a pair of rotating magnetic recording discs.

Referring to the drawings and particularly to FIG. 1, a support arm 10 is there shown for supporting a pair of magnetic recording transducer means, each designated generally by an arrow 11. Each transducer 11 includes a hydrodynamic bearing member or "shoe" portion 12 containing an encapsulated electrical cell 13. Each cell 13 includes a magnetic recording probe 14 (only the tip of which can be seen in FIG. 1) interposed between a pair of magnetic shielding surfaces 15 machined flush with the surface of shoe 12. Transducers 11 are arranged to be radially positionable between a pair of magnetic recording discs 16 (FIG. 2) and to be closely supported therefrom by a film 17 of air acting between the active surface of shoes 12 and discs 16. As is known in the magnetic recording art wherein fluid bearing transducers are employed, the film 17 will support shoe 12 in closely spaced relation even when rather large compressive forces are acting thereon. Shoes 12, however, must be free to permit this spacing to be maintained uniform during the rotation of discs 16 in order to preclude objectionable variations in the electrical signals at recording probe 14, since it is well-known that recording and sensing signals will vary according to the spacing of such a probe 14 from its recording surface 16. Since discs 16 are usually not perfectly flat, i.e., some small degree of warping or "run out" is to be expected so that the discs 16 will usually move slightly up and down as they rotate, it is to be appreciated that transducers 11 must be free to follow the surface contour of discs 16 as they rotate at high speed in order to maintain the gap between the recording surface and probe 14 constant at all times to insure proper electrical signals thereat.

For this purpose there is provided a biaxial torsion element 18 between each transducer 11 and arm 10. Each element 18 is preferably formed from a single integral sheet of a suitable material such as spring steel, which is firm but resilient. Each element 18 is formed to have a pair of thin, flat intersecting members 18a and 18b. The thinner these members 18a and 18b are and the lighter their weight, the better will be their surface-following characteristics. However, a feature of the invention is that element 18 is a non-precision part and a .006 inch thickness has been found quite satisfactory. In order to permit members 18a of both elements 18 to rock about the longitudinal axis of each member 18b, a pair of annular spacers 19 have been provided for insertion between the ends of members 18b and arm 10. In addition, there is provided a hole 21 in arm 10 directly in line with the righthand end of the members 18a to permit them to turn a considerable degree about members 18b. Similarly, in order to permit members 18b to clear cells 13 and be free to rock about the longitudinal axis of each member 18a the back sides of shoes 12 have been provided with a pair of interiorly threaded raised boss portions 22, each of which is in alignment with a screw hole 23 drilled through each end of members 18a. The ends of members 18a and 18b are suitably rigidly secured, as by screws 24, to arm 10 and shoes 12 respectively. Soldering or welding would also be satisfactory for this purpose. Finally, fine flexible wire leads 25 are attached to each cell 13 and are supported along arm 10 to suitable electrical controls (not shown).

Figure 2:
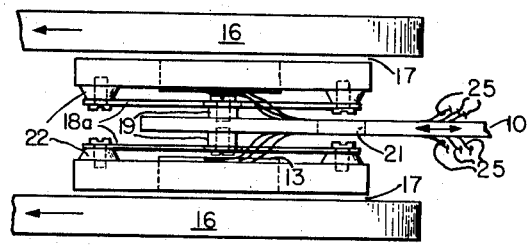
FIG. 2 is an assembled view of FIG. 1 shown in elevation.
Figure 3:
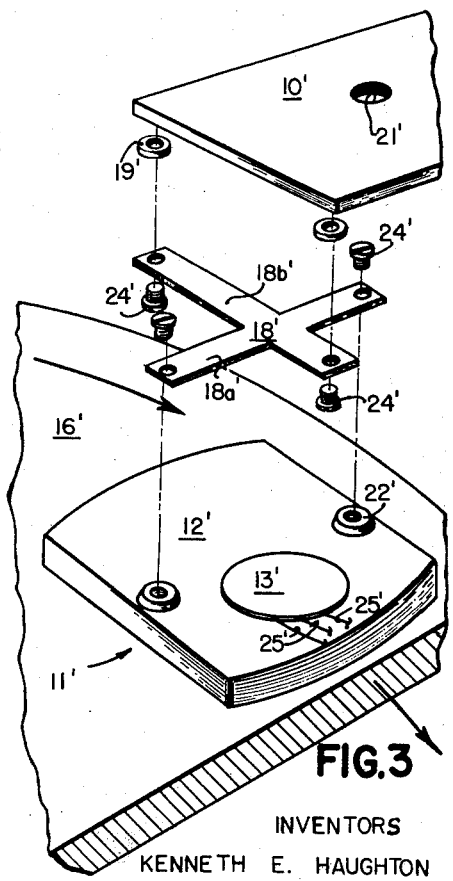
FIG. 3 is an exploded perspective view of an alternative embodiment of the invention for achieving a closer spaced relation between the transducer and the disc surface.

Referring to FIGS. 1 and 2 it will be noted that members 18a and 18b intersect substantially at their mutual midpoints. Such an arrangement will tend to establish the bearing surface of shoes 12 more nearly parallel with the recording surface. This feature will be particularly useful where it is desired to employ several cells 13 in a single shoe 12. In the embodiment of FIG. 3, an arrangement similar to the lower half of the arrangement in FIG. 1 is shown and hence need not be described in detail with the exception that in FIG. 3, member 18a' intersects member 18b' to the right of the midpoint of the latter. By so locating the intersection of members 18a' and 18b', shoe 12' will "plane" as explained above, i.e., the trailing portion of shoe 12 will be more closely spaced to the surface of disc 16' than when it was substantially parallel with the result that the number of discrete bits of information capable of being recorded per lineal increment will be correspondingly increased. Therefore, cell 13' has been placed more to the rear of shoe 12' to take advantage of the reduced spacing possible which provides the improved recording density.

Figure 4:
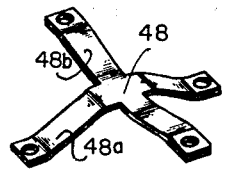
FIG. 4 is a perspective view of an alternative embodiment of the biaxial torsion element of FIGS. 1 through 3 designed to "take up" larger compressive loading applied to the transducer.

In FIG. 4 another embodiment of element 18 is shown and designated 48. The intersecting members 48a and 48b of element 48 are arc shaped and the arcs disposed in opposite directions for the purpose of absorbing larger compressive forces between support arm 10 and the recording surface for use where such larger compressive forces are to be anticipated.

While there have been shown and described and pointed out the fundamental novel features of the invention as applied to the preferred embodiment, it will be understood that various omissions and substitutions and changes in the form and details of the device illustrated and in its operation may be made by those skilled in the art without departing from the spirit of the invention. For example, members 18a and 18b could be made separately and welded, fastened or in some other manner be rigidly joined at their point of intersection as well as at their ends as explained above. Also, spacers 19 could have been used in place of bosses 22. It is the intention, therefore, to be limited only as indicated by the scope of the following claims.

What is claimed is:

1. In a mounting for supporting a hydrodynamic bearing element in close spaced constant following relation to a surface moving rapidly with respect thereto, a support arm, and a biaxial torsion mounting element including a first and second elongated resilient member, said second member being angularly disposed with respect to said first member so as to intersect said first member, said intersection being substantially midway between the ends of one of said members, said members being rigidly joined at said intersection so that each of said members can twist the other of said members along the longitudinal axis of the latter, the ends of said first member being firmly secured to said support arm, and the ends of said second member being firmly secured to said bearing element whereby said bearing element will be supported to smoothly follow the contour of said surface while maintaining said spaced relation constant.

2. A biaxial torsion mounting for coupling a hydrodynamically supported magnetic recording transducer means to a support arm and for maintaining said transducer in constant, close spaced relation to a rapidly moving recording surface, said mounting including a first and second elongated resilient member, said second member being angularly disposed with respect to said first member so as to intersect said first member, said members being rigidly joined at said intersection so that via said intersection each of said members is free to cause twisting along the longitudinal axis of the other, the ends of said first member being firmly secured to said support arm, and the ends of said second member being firmly secured to said transducer means whereby said biaxial mounting flexes with the motion of said transducer means as it follows the contour of said surface under applied compressive forces thereon to constantly maintain said transducer means closely and uniformly spaced from said surface.

3. The invention as defined in claim 2 wherein said second member is disposed substantially normal to said first member and formed integrally therewith at said intersection.

4. A transducer mounting assembly for coupling a pair of hydrodynamically supported magnetic recording transducers to a single support arm movably disposed between a pair of rapidly rotating recording surfaces and for maintaining said transducers in constant close spaced relation to said surfaces, said assembly including a pair of biaxial torsion mounting elements each comprised of a first and second thin, flat, elongated resilient member, said second member being angularly disposed with respect to said first member so as to intersect said first member, said first and second members being rigidly joined at said intersection so that each of said members can twist the other along its longitudinal axis, means for firmly securing the ends of said first members of both said torsion elements to opposite sides of said support arm, and means for firmly securing the ends of said second members of both said torsion elements to an associated one of said transducers whereby said transducers will smoothly follow the contour of their associated recording surface under applied compressive forces acting thereon while maintaining a constant predetermined closely spaced relationship therewith.

5. The invention as defined in claim 4 wherein said second members are disposed substantially normal to said first members and formed integrally therewith at their respective intersections.

6. A transducer mounting assembly for supporting a pair of hydrodynamically supported magnetic recording transducers between an associated pair of closely spaced rapidly moving opposed recording surfaces, said assembly comprising a support arm positionable between said surfaces, a pair of transducers disposed on opposite sides of said arm, and a biaxial torsion element interposed between each said transducer and said arm, each of said torsion elements including a first and second thin, flat, resilient member, said first and second members being disposed substantially normal to each other in the same plane to provide an intersection therebetween, said members of each said biaxial element being integral at said intersection so that each of said members can twist the other, means for firmly securing the ends of said first members to said support arm, and means for firmly securing the ends of said second members to an associated one of said transducers whereby each of said biaxial elements flexes to give with the motion of its associated transducer as the latter follows the contour of a recording surface.

7. A transducer mounting assembly for supporting a pair of hydrodynamically supported magnetic recording transducers between an associated pair of closely spaced rapidly moving opposed recording surfaces, said assembly comprising a support arm positionable between said surfaces, a pair of transducers disposed on opposite sides of said arm, and a biaxial torsion element interposed between each said transducer and said arm, each of said torsion elements including a first and second thin, flat, resilient member, said first and second members being disposed substantially normal to each other in the same plane to provide an intersection therebetween, said members of each said biaxial element being integral at said intersection so that each of said members can twist the other, means for firmly securing the ends of said first members to said support arm, and means for firmly securing the ends of said second members to an associated one of said transducers whereby each of said biaxial elements flexes to give with the motion of its associated transducer as the latter follows the contour of a recording surface.

References Cited in the file of this patent
UNITED STATES PATENTS

| | | |
|---|---|---|
| 1,181,872 | Grundy | May 2, 1916 |
| 2,560,569 | Hare | July 17, 1951 |
| 2,862,781 | Baumeister | Dec. 2, 1958 |